(12) United States Patent
Rogers et al.

(10) Patent No.: US 8,832,122 B2
(45) Date of Patent: Sep. 9, 2014

(54) MEDIA LIST MANAGEMENT

(75) Inventors: Matthew Rogers, Sunnyvale, CA (US); Christopher R. Wysocki, Cupertino, CA (US); Timothy Patrick Hannon, Campbell, CA (US)

(73) Assignee: Apple Inc., Cupertino, CA (US)

( * ) Notice: Subject to any disclaimer, the term of this patent is extended or adjusted under 35 U.S.C. 154(b) by 856 days.

(21) Appl. No.: 12/242,906

(22) Filed: Sep. 30, 2008

(65) Prior Publication Data

US 2010/0094880 A1  Apr. 15, 2010

(51) Int. Cl.
*G06F 17/30* (2006.01)
*G06F 7/00* (2006.01)

(52) U.S. Cl.
CPC .................. *G06F 17/30053* (2013.01)
USPC .......................................... 707/752; 707/796

(58) Field of Classification Search
USPC ............... 707/752, 796; 369/30.28, 30.03
See application file for complete search history.

(56) References Cited

U.S. PATENT DOCUMENTS

| | | | | |
|---|---|---|---|---|
| 4,899,331 A * | 2/1990 | Masaki et al. | ........... | 369/178.01 |
| 5,365,502 A * | 11/1994 | Misono | ........................... | 369/18 |
| 6,112,019 A * | 8/2000 | Chamdani et al. | ............ | 712/214 |
| 6,707,768 B2 * | 3/2004 | Schilling et al. | ........... | 369/30.08 |
| 6,836,437 B2 * | 12/2004 | Li et al. | ......................... | 365/194 |
| 6,904,004 B1 * | 6/2005 | Van der Meulen | ........ | 369/30.28 |
| 6,987,221 B2 * | 1/2006 | Platt | ................................. | 84/601 |
| 7,102,069 B2 * | 9/2006 | Georges | ........................... | 84/609 |
| 7,169,996 B2 * | 1/2007 | Georges et al. | ................. | 84/609 |
| 7,228,437 B2 * | 6/2007 | Spagna et al. | ................ | 713/193 |
| 7,424,431 B2 * | 9/2008 | Greene et al. | .................. | 704/270 |
| 7,536,565 B2 * | 5/2009 | Girish et al. | .................. | 713/300 |
| 7,644,376 B2 * | 1/2010 | Karachale et al. | ............ | 715/864 |
| 7,655,855 B2 * | 2/2010 | Georges et al. | ................. | 84/609 |
| 8,019,802 B2 * | 9/2011 | Rose et al. | .................... | 708/254 |
| 2003/0061305 A1 * | 3/2003 | Copley et al. | ................. | 709/217 |
| 2003/0131715 A1 * | 7/2003 | Georges | ........................... | 84/609 |
| 2003/0221541 A1 * | 12/2003 | Platt | ................................. | 84/609 |
| 2004/0042282 A1 * | 3/2004 | Li et al. | ......................... | 365/200 |
| 2004/0089131 A1 * | 5/2004 | Georges et al. | ................. | 84/609 |
| 2006/0153019 A1 * | 7/2006 | Lotz et al. | .................... | 369/30.03 |
| 2006/0153040 A1 * | 7/2006 | Girish et al. | ............... | 369/59.21 |
| 2006/0206478 A1 * | 9/2006 | Glaser et al. | ...................... | 707/5 |
| 2007/0207854 A1 * | 9/2007 | Wolf et al. | ...................... | 463/29 |
| 2007/0230290 A1 * | 10/2007 | Chiu | .......................... | 369/30.08 |
| 2007/0230694 A1 * | 10/2007 | Rose et al. | ...................... | 380/46 |
| 2007/0278860 A1 * | 12/2007 | Krieger et al. | .................. | 307/64 |
| 2008/0091721 A1 * | 4/2008 | Harboe et al. | ............. | 707/104.1 |
| 2009/0313303 A1 * | 12/2009 | Spence et al. | .............. | 707/104.1 |
| 2009/0313432 A1 * | 12/2009 | Spence et al. | ................ | 711/115 |

* cited by examiner

*Primary Examiner* — Pavan Mamillapalli
(74) *Attorney, Agent, or Firm* — Blakely, Sokoloff, Taylor & Zafman LLP (57) ABSTRACT

Systems, methods, and computer program products are provided for managing a playlist on a portable media device including generating a random order of media items based on a seed, receiving an instruction to power down the portable media device, saving the seed in a storage, and powering down the portable media device.

34 Claims, 6 Drawing Sheets

MEDIA LIST MANAGEMENT

FIELD OF THE INVENTION

The invention relates to media list management and, more particularly, to managing a list of media items on a portable media player.

BACKGROUND OF THE DISCLOSURE

Portable media players are often light, compact and durable. However, to be offered at a competitive price, they generally come with limited memory. Limited memory forces manufacturers to find creative ways to manage content or, in some cases, to exclude some features altogether. A limited memory player is needed that offers the same features as more expensive players.

SUMMARY OF THE DISCLOSURE

Embodiments of the invention relate to a method and computer program product for managing a playlist on a portable media device which may include generating a random order of the plurality of media items based on a seed, receiving an instruction to power down the portable media device, saving the seed in a storage, and powering down the portable media device.

Other embodiments of the invention relate to a method and computer program product for resuming a random playlist on a portable media device which may include accessing a stored seed, generating a random order of the plurality of media items based on the seed, and playing one of the plurality of media items.

Other embodiments of the invention relate to a method and computer program product for managing a playlist on a portable media device which may include generating a random playlist of media items based on a seed, receiving an instruction to play the random playlist, incrementing a counter for each media item played, and storing the seed and the counter in a non-volatile storage for regenerating the random playlist.

Other embodiments of the invention relate to a system for managing a playlist on a portable media device including a storage and a processor. The processor may be configured to generate a random order of media items based on a seed and to save the seed in the storage before powering down the portable media device.

Other embodiments of the invention relate to a system for managing a playlist on a portable media device including a memory, a storage, and a processor. The processor may be configured to copy a seed from the storage to the memory and to generate a random order of media items based on the seed.

Other embodiments of the invention relate to a method for managing a playlist on a portable media device including generating a random order of the plurality of media items based on a seed, receiving an instruction to power down the portable media device, saving the seed in a storage, and powering down the portable media device.

Other embodiments of the invention relate to a method and computer program product for managing a playlist on a portable media device which may include playing a first playlist, receiving an instruction to play a second playlist, copying to a memory a seed and a counter value associated with the first playlist, and playing the second playlist.

Other embodiments of the invention relate to a method and computer program product for managing a playlist on a portable media device which may include identifying a media item in the random playlist based on the seed, determining whether the media item has been played, repeating the identify step if the media item has been played, and playing the media item if the media item has not been played.

BRIEF DESCRIPTION OF THE DRAWINGS

The above and other aspects and features of the invention will become more apparent upon consideration of the following detailed description, taken in conjunction with the accompanying drawings, in which like reference characters refer to like parts throughout, and in which.

DETAILED DESCRIPTION OF THE DISCLOSURE

Embodiments of the invention relate to systems, methods and computer products for managing data on a portable media player and, more particularly, to managing random playlists on a portable media player. For example, one embodiment relates to saving a seed used to generate a random playlist so that the seed can be used to regenerate the random playlist, such as each time the media player is powered on.

In the following discussion of illustrative embodiments, the term "media items" generally refers to data that encodes audio, video, graphic, or other presentation information or content including, but not limited to podcasts, movies, TV shows, and audiobooks. The term "playlist," as used herein, generally refers to a custom index of media items that may be played according to a default or random sequence. The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "based on," as used in the claims and specification herein, is not exclusive and allows for being based on additional factors that may or may not be described.

It is to be understood that the figures and descriptions of the invention have been simplified to illustrate elements that are relevant for a clear understanding of the invention while eliminating, for purposes of clarity, other elements. For example, certain details relating to the creation of playlists on a media player are not described herein. Similarly, certain details relating to random number generators and pseudo-random algorithms are not described herein. A discussion of these elements is not provided because they are well known in the art and because they do not facilitate a better understanding of the invention.

Figure 1:
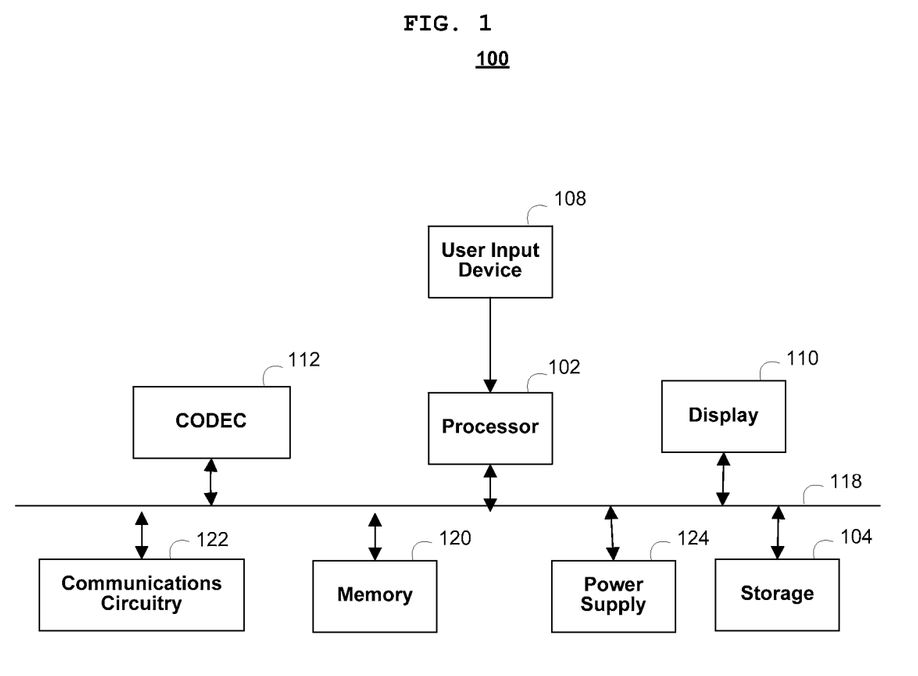
FIG. 1 shows a simplified block diagram of a portable media player in accordance with some embodiments of the invention.

FIG. 1 shows a simplified functional block diagram of a portable media player 100 according to some embodiments of the invention. Media player 100 may include a processor 102, storage 104, a user input device 108, a display 110, a coder/decoder (CODEC) 112, a bus 118, a memory 120, a communications circuitry 122, and a power supply 124.

Processor 102 may be a processor, an application-specific integrated circuit (ASIC), or any combination thereof. Processor 102 can control operation of many functions and other circuitry included in media player 100 including, for example, receiving user inputs from user input device 108. While media player 100 is illustrated with a single processor, those skilled in the art will appreciate that an electronic device may include multiple processors and/or co-processors.

Storage 104 may be any non-volatile storage device in which the information stored may remain in storage 104 after media device 100 is turned off. Storage 104 may include one or more non-volatile storage mediums, including for example, a hard-drive, flash memory, and permanent memory such as ROM. Storage 104 may store media (e.g., music and video files), software (e.g., for implementing functions on device 100), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device 100 to establish wireless communication with another device), subscription information (e.g., information that keeps tracks of podcasts or television shows or other media a user may subscribe to), and any other suitable data.

Memory 120 may include one or more different types of volatile memory which may be used for performing device functions. For example, memory 120 may include cache, read-only memory (ROM), and/or random access memory (RAM).

Bus 118 may provide a transfer path for transferring data and/or power to, from, or between the components of media player 100. Coder/decoder (CODEC) 112 may be provided to convert digital audio signals into analog signals, which may be provided to an output port (not shown). Bus 118 can be configured to permit unidirectional and/or bidirectional communication between the components and interfaces.

User input device 108 may allow a user to interact with media player 100. For example, user input device 108 can take a variety of forms, such as a button, keypad, dial, click wheel, or touch screen.

Communications circuitry 122 may include circuitry for wireless communication (e.g., short-range and/or long range communication). For example, wireless communications circuitry 122 may be Wi-fi enabling circuitry that permits wireless communication according to one of the 802.11 standards. Other wireless network protocols standards could also be used, either as an alternative to the identified protocols or in addition to the identified protocol. Other network standards may include Bluetooth, the Global System for Mobile Communications (GSM), and code division multiple access (CDMA) based wireless protocols. Communications circuitry 122 may also include circuitry that enables device 100 to be electrically coupled to another device (e.g., a computer or an accessory device) and communicate with that other device.

In some embodiments, media player 100 may be a portable computing device dedicated to processing media such as audio and video. For example, media player 100 may be a media player (e.g., an MP3 player), a game player, a remote controller, a portable communication device, a remote ordering interface, or any other suitable portable device. Media player 100 may be battery-operated (e.g., power supply 124) and highly portable so as to allow a user to listen to music, play games or video, record video or take pictures, communicate with others, and/or control other devices. In addition, media player 100 may be sized such that is fits relatively easily into a pocket or hand of a user.

It is to be appreciated that FIG. 1 can describe software that acts as an intermediary between users and the basic resources described in portable media player 100. Such software may include an operating system. The operating system, which can be resident in storage 104, may act to control and allocate resources of portable media player 100. System applications may take advantage of the management of resources by the operating system through program modules and program data stored in storage 104. Furthermore, it is to be appreciated that the invention can be implemented with various operating systems or combinations of operating systems.

The computer readable storage medium may tangibly embody a program, functions, and/or instructions that may cause portable media player 100 to operate in a specific and predefined manner as described herein. Those skilled in the art will appreciate, however, that the systems and methods described below may be implemented at any level, ranging from hardware to software including, but not limited to, firmware, resident software, and microcode.

These are representative components of a portable media player whose operation is well understood. Furthermore, those of ordinary skill in the art will appreciate that portable media player 100 illustrated herein is exemplary only and that the invention can operate within a number of different configurations.

Figure 2:
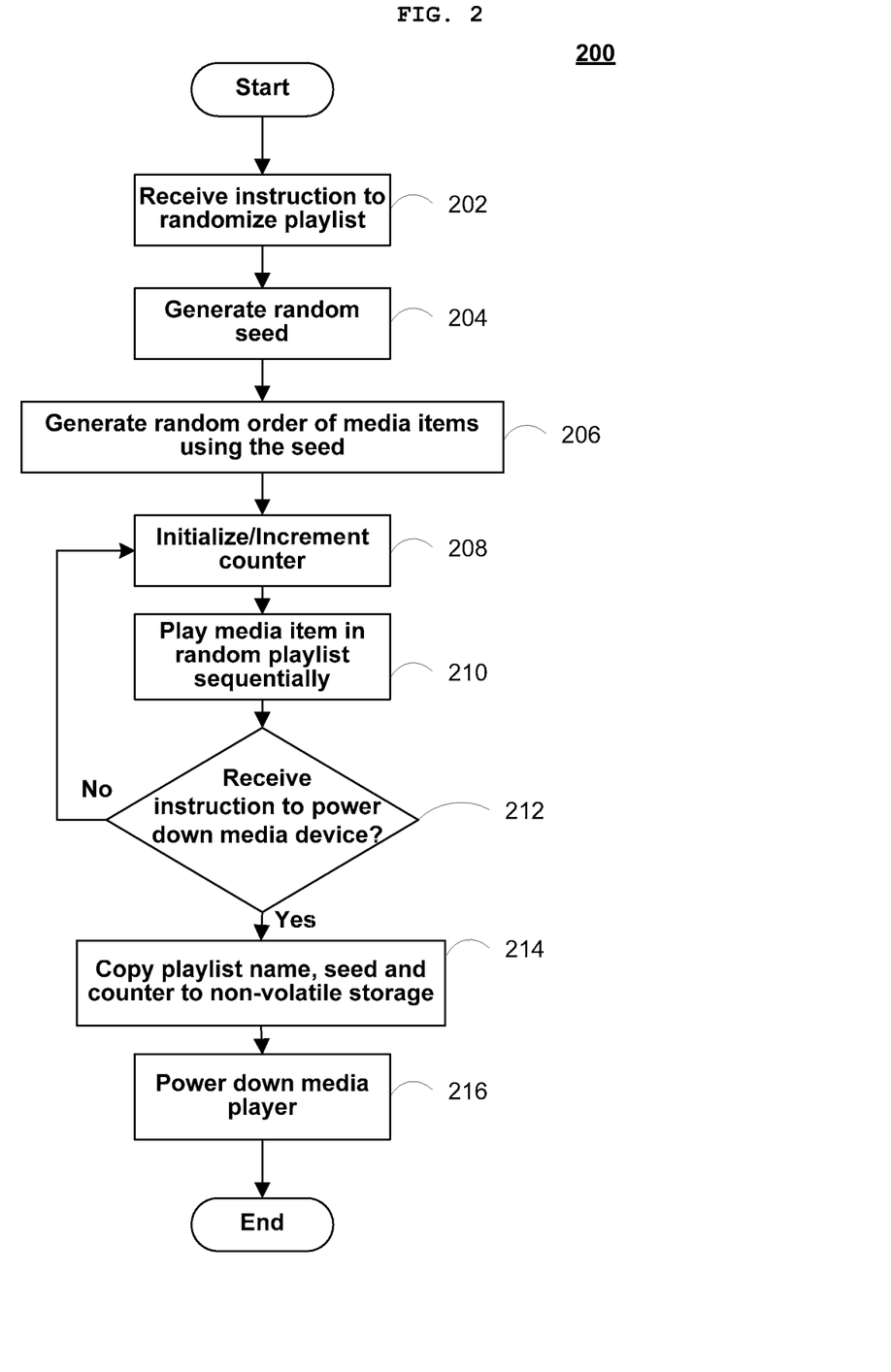
FIG. 2 is a process diagram of an exemplary method for managing a random playlist according to some embodiments of the invention.

FIG. 2 is a process diagram of an exemplary method 200 for managing playlist information according to some embodiments of the invention. Method 200 begins at step 202 as a media player (e.g., media player 100) receives an instruction to randomize a media playlist. The playlist may be created using any known method, whether done automatically or through user input. For example, the playlist can be created by a user that selects each media file, such as a song, video or, any other media. In other embodiments, the playlist can be generated automatically based on user preferences.

The playlist selected to be randomized at step 202 may be one of several playlists stored on, or otherwise accessible to, the media player. For example, a media player may have access to two playlists, one playlist includes songs by The Beatles and another playlist includes songs by The Eagles.

At step 204, a random seed may be generated using a random number generator and then saved to memory (e.g. memory 120). The seed may be generated using any suitable random number generator known to those skilled in the art. In some embodiments, the random number generator may select any random number between 1 and the number of media items available to be played. For example, if the Beatles playlist includes five songs, the randomly generated seed may be 3.

At step 206, the seed generated at step 204 may be used as an input to an algorithm for generating a particular sequence of media items. In some embodiments, the algorithm may be any suitable randomization algorithm for shuffling items that is repeatable by using the same seed, such as Tomasulo's algorithm. Such an algorithm is sometimes referred to as a pseudo-random generator. For example, if the Beatles playlist includes five songs B1, B2, B3, B4, and B5, a randomly generated seed of 3 may be used to generate a shuffled order of B3, B1, B5, B2, and B4. If step 206 were repeated using the same seed of 3, the resulting order of media items would be identical, namely B3, B1, B5, B2, and B4.

At step 208, a counter may be initialized so that it can be incremented for each media item played in the playlist. For example, the counter may be initialized to "1" for a new playlist and incremented each time a media item from that playlist has finished playing. At step 210, the media player may begin playing the first media item in the shuffled playlist generated at step 206 (e.g., "B3"), either automatically or based on user input. In some embodiments, playback may be modified based on user input or user preferences, which may cause the media player to skip, replay, or pause selected media items either in whole or in part.

At step 212, the media player may check whether an instruction to power down has been received. If no instruction has been received, steps 208 and 210 may be repeated. If the media player receives an instruction to power down, such as from the user or automatically (e.g., a low battery indication or any other memory clearing operation), then method 200 proceeds to step 214. At step 214, the seed, the playlist name, and the value of the counter may be copied from volatile memory to nonvolatile storage (e.g., memory 120 to storage 104). For example, if an instruction to power down is received after the second song on the shuffled Beatles playlist has just begun playing, the media player may save, in non-volatile storage, the seed used to create the shuffled Beatles playlist in step 206 (e.g., "3"), the playlist name (e.g., "Beatles"), and the value of the counter (e.g., "2") to indicate that the second song in the shuffled Beatles playlist was playing (e.g., "B1"). At step 216, the media player may execute the instruction to power down the device.

In some embodiments, step 210 may include starting a timer that tracks the elapsed playing time of the shuffled playlist. The timer may continue until an instruction to power down the media device is received at step 212. For example, if the first song in the shuffled playlist (e.g., "B3") is 2 minutes and 30 seconds long and, if during play of the second song in the shuffled playlist (e.g., "B1"), an instruction to power down the device is received at 1-minute, and then the value of the timer may be 3 minutes and 30 seconds. The value of the timer may be copied to non-volatile storage in step 214. In other embodiments, the timer may correspond to the elapsed time of a media track, rather than the cumulative playing time of the shuffled playlist. In such embodiments, the timer can be used in combination with the value of the counter to achieve similar results.

Figure 3:
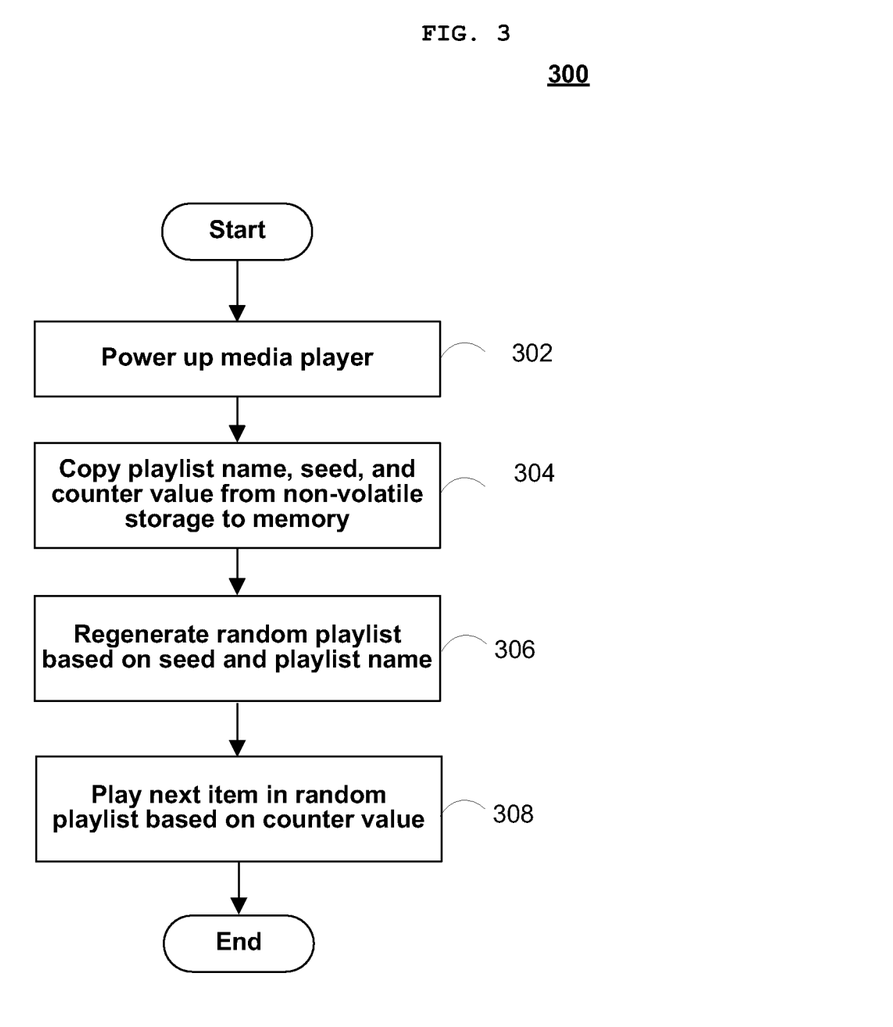
FIG. 3 is a process diagram of an exemplary method for resuming play of a random playlist according to some embodiments of the invention.

FIG. 3 is a process diagram of an exemplary method 300 for resuming play of the random playlist created by method 200. At step 302, the media player receives an instruction to power up. At step 304, a seed, a playlist name, and a value of the counter may be loaded from non-volatile storage to volatile memory (e.g., storage 104 to memory 120). At step 306, the media player may regenerate the random playlist (e.g., random order of media items from the playlist name) based on the seed. At step 308, the media player may begin playing the media item in the shuffled playlist that corresponds to the value of the counter. For example, the media player may load the seed of "3," the playlist name of "Beatles," and the counter value of "2" into memory and then may regenerate the random playlist of B3, B1, B5, B2, and B4. Finally, at step 308, the media player may begin playing the media item in the random playlist corresponding to the counter value (e.g., "B1").

Figure 4:
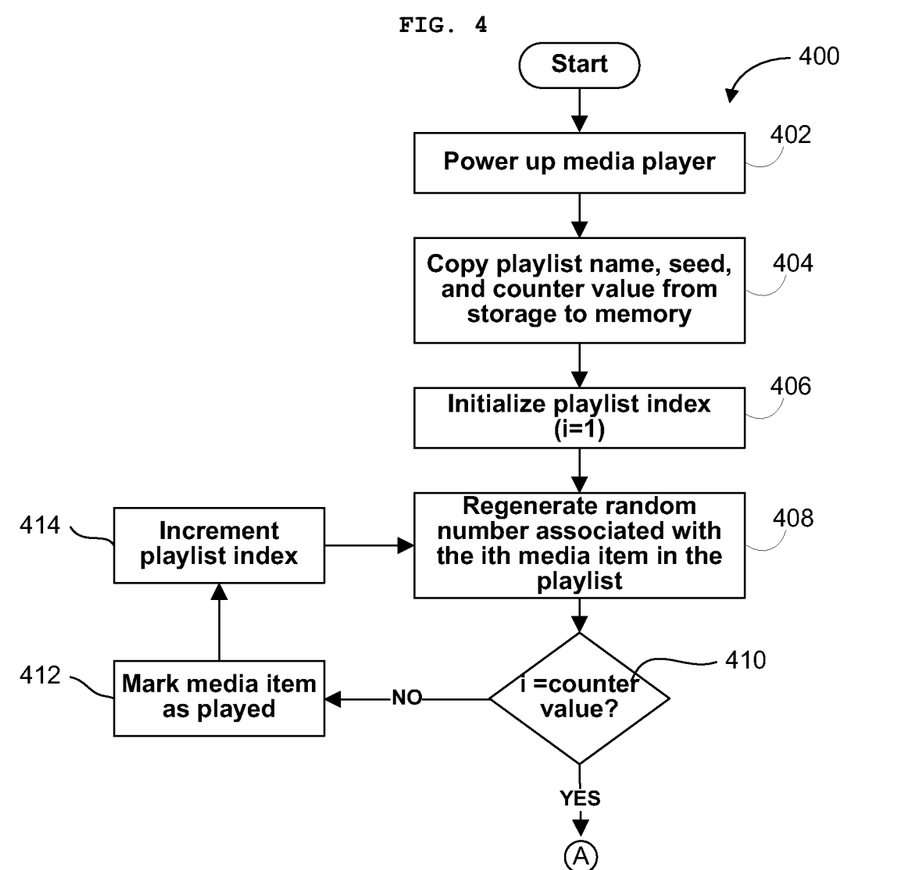
FIGS. 4 and 5 show a process diagram of another exemplary method for resuming play of a random playlist according to some embodiments of the invention.

FIG. 4 is a process diagram of an exemplary method 400 for resuming play of a random playlist, such as one created using method 200. Some embodiments of method 400 may be used to selectively generate only the media items needed to resume play of the shuffled playlist, rather than regenerating the whole playlist.

At step 402, the media player may receive an instruction to power up. At step 404, a seed, a playlist name, and a value of the counter may be loaded from non-volatile storage to volatile memory (e.g., storage 104 to memory 120). At step 406, the media player may initialize a playlist index, such as by setting the playlist index equal to "1." At step 408, the media player may regenerate a random number based on the seed, where the random number is associated with the media item in the playlist that corresponds to the playlist index. For example, the media player may load a seed of "3," a playlist name of "Beatles," and a counter value of "2" into memory (e.g., memory 120) and then use the seed of "3" to regenerate the random number. The random number may be associated with the first media item (e.g., "B3") in the shuffled playlist of B3, B1, B5, B2, and B4.

At step 410, if the playlist index is equal to the counter value, the media player plays the current media item in step 416. Otherwise, if the playlist index is less than, or not equal to, the counter value then the media player may mark the current media item as played at step 412, increment the playlist index in step 414, and then return to step 408 to regenerate a random number for the next media item in the playlist. For example, the media player may determine in step 410 that the current playlist index of "1" is less than the counter value of "2" and, in step 412, mark media item B3 as played. Next, in step 412, the media player may increment the playlist index to "2" before returning to step 408.

At step 408, the media player may use the seed to generate a random number associated with the next item in the playlist. In some embodiments, the media player may be configured to overwrite the random number generated in the prior execution of step 408. In the Beatles playlist example, at the second execution of step 410, the media player may determine that the playlist index of "2" is equal to the counter value of "2" and play current media item in the shuffled playlist of B3, B1, B5, B2, and B4 (i.e., "B1").

Figure 5:
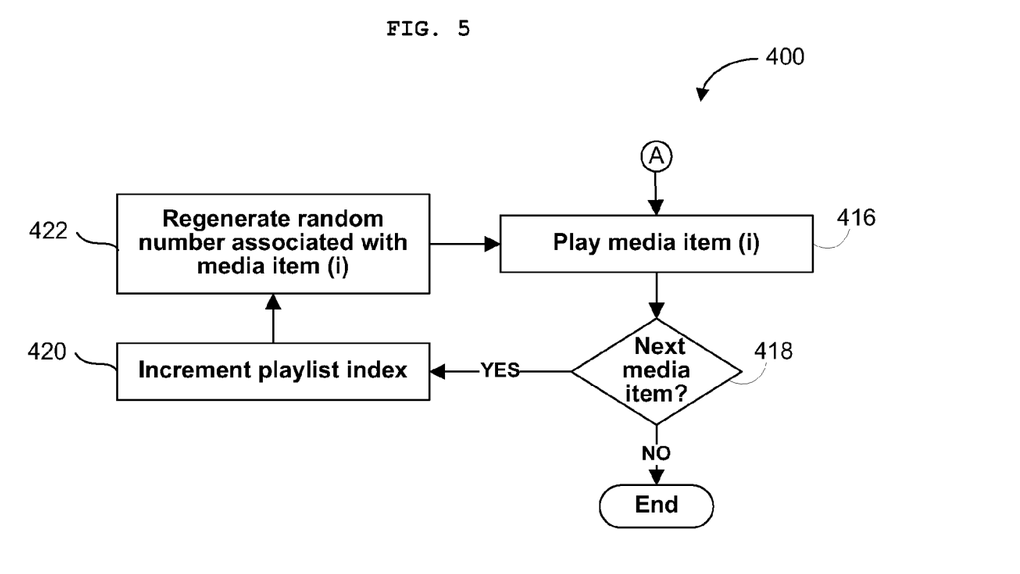

Method 400 continues in FIG. 5 at step 418 where the media player may determine whether the shuffled playlist has more media items that have not been played. If there are no more media items in the playlist to be played, method 400 ends. Otherwise, at step 420, the media player may increment the playlist index and may, at step 422, use the seed to generate a random number associated with the media item corresponding to the playlist index. For example, the media player may determine in step 418 that the next media item in the shuffled playlist ("B5") has not been played. At step 420, the media player may increment the playlist index to "3" and, in step 422, use the seed to generate the random number for the third media item in the shuffled Beatles playlist (i.e., "B5").

Those skilled in the art will appreciate that method 400 may use less memory by saving just one bit (e.g., the index number) associated with the current media item rather than the entire order of the shuffled playlist. Method 400 may be useful to keep track of the media items played rather than the particular order the media items were played. Method 400 may be adapted to allow a user of the media player to skip backwards through the shuffled playlist, such as to play a previously played media item, by saving (e.g., in cache) the last few media items generated. For example, if the media player is playing media item B4 from the shuffled Beatles playlist of B3, B1, B5, B2, and B4, and the media player is configured to save the last two media items played, the user may be able to skip back as far as media item B5. If the user tries to skip back to media item B1, the media player may be configured to start from the beginning and play media item B3.

Figure 6:
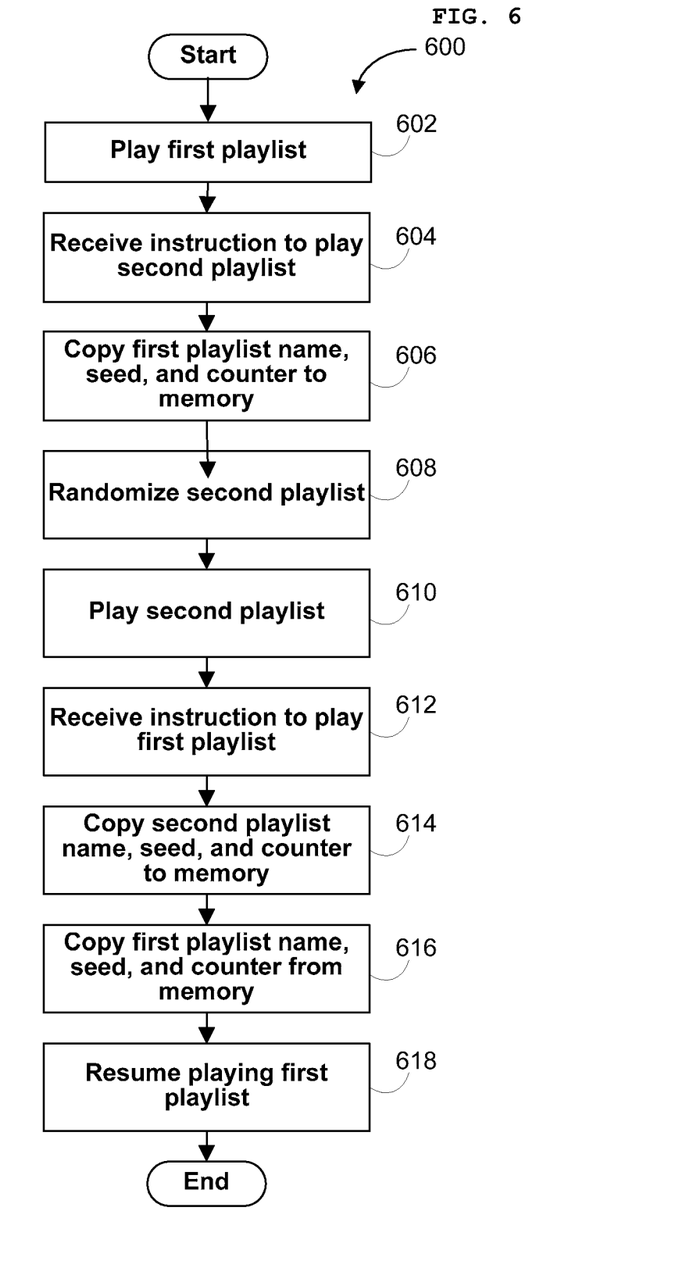
FIG. 6 is a process diagram of an exemplary method for switching between random playlists according to some embodiments of the invention.

FIG. 6 is a process diagram of an exemplary method 600 for switching between playlists according to some embodiments of the invention. At step 602, the media player may receive an instruction to play a first playlist. At step 604, the media player may receive an instruction to play a second playlist, such as while the first playlist is playing. For example, the media player may receive an instruction to play the Beatles playlist at step 602 and, during play of the second song of the Beatles playlist, the media player may receive an instruction to play the Eagles playlist at step 604.

At step 606, the media player may copy the playlist name, seed, and counter associated with the first playlist to memory. For example, the media player may store the playlist name "Beatles," the seed of "3," a counter value of "2" in memory (e.g., memory 120). In some embodiments, the playlist name, seed, and counter for multiple playlists may also be stored in non-volatile storage so that a user of media player can switch between shuffled playlist even after the media player is powered off or the memory is otherwise cleared.

At step 608, the media player may randomize the second playlist and begin playing the randomized playlist in step 610. For example, the media player may randomize the Eagles playlist using method 200 based on a seed. At step 612, the media player may receive an instruction to resume play of the first playlist (e.g., the Beatles playlist). At step 614, the media player may copy the playlist name, the seed, and counter value to memory.

At step 616, to resume play of the first playlist, the media player may retrieve from memory the information stored in step 606 and resume play of the first playlist at step 618. For example, the media player may copy the playlist name "Beatles," the seed of "3," and the counter value of "2" from memory and resume playing second media item in the Beatles playlist (i.e., "B1").

While the systems and methods of the invention have been described in terms of saving a playlist name, other playlist identifiers may be used without departing from the scope of the invention. For example, a storage location such as an index indicative of the order the playlists are stored in non-volatile memory may be used. These identifiers may be used instead of, or in addition to, the playlist name.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

One of ordinary skill in the art should appreciate that the invention may take the form of an entirely hardware embodiment or an embodiment containing both hardware and software elements. In particular embodiments, such as those embodiments that relate to methods, the invention may be implemented in software including, but not limited to, firmware, resident software, and microcode.

One of ordinary skill in the art should also appreciate that the methods and systems of the application may be practiced in embodiments other than those described herein. It will be understood that the foregoing is only illustrative of the features disclosed herein, and that various modifications can be made by those skilled in the art without departing from the scope and spirit of the invention.

What is claimed is:

1. A non-transitory computer readable medium including instructions for managing a playlist of a plurality of media items on a portable media device which, when executed by a processing system, cause the processing system to perform a method, the method comprising:

generating a random seed, wherein the random seed once generated, is used as an input to generate a random playlist, resulting in a particular sequence of the plurality of media items, the particular sequence randomly generated;

using the generated random seed as the input, generating the particular sequence of the plurality of media items for defining the random playlist;

receiving an instruction to power down the portable media device;

saving the random seed in a storage of the portable media device, wherein the generated random seed is used to regenerate the random playlist with the particular sequence of the plurality of media items; and powering down the portable media device.

2. The non-transitory computer readable medium of claim 1, further comprising:

playing at least one of the plurality of media items according to the particular sequence of the random playlist prior to receiving the instruction;

updating a counter for tracking the playing of the at least one of the plurality of media items; and saving the counter before powering down the portable media device.

3. The non-transitory computer readable medium of claim 2, further comprising:

powering on the portable media device after powering down the portable media device;

accessing the saved random seed from the storage;

regenerating the particular sequence of the plurality of media items based on the accessed saved random seed for redefining the random playlist;

accessing the saved counter; and playing at least a particular one of the plurality of media items according to the regenerated particular sequence based on the accessed saved counter.

4. The non-transitory computer readable medium of claim 1, further comprising:

playing at least one of the plurality of media items according to the particular sequence of the random playlist prior to receiving the instruction;

updating a timer for tracking the playing of the at least one of the plurality of media items; and saving the timer before powering down the portable media device.

5. The non-transitory computer readable medium of claim 1, further comprising:

saving a playlist identifier associated with the playlist before powering down the portable media device.

6. The non-transitory computer readable medium of claim 1, wherein the particular sequence is generated using the random seed as an input to a pseudo-random generator.

7. The non-transitory computer readable medium of claim 1, wherein the particular sequence is generated using the random seed as an input to Tomasulo's algorithm.

8. The non-transitory computer readable medium of claim 1, wherein the random seed is an integer.

9. The non-transitory computer readable medium of claim 1, wherein the saving is performed in response to the receiving.

10. The non-transitory computer readable medium of claim 1, wherein the instructions, when executed by the processing system, further cause the method to comprise:

powering on the portable media device after powering down the portable media device;

accessing the saved random seed from the storage; and
regenerating the particular sequence of the plurality of media items based on the accessed saved random seed for redefining the random playlist.

11. A non-transitory computer readable medium including instructions for resuming a random playlist of a plurality of media items on a portable media device which, when executed by a processing system, cause the processing system to perform a method, the method comprising:
powering up the portable media device;
accessing a stored random seed from a storage of the portable media device, the stored random seed having been stored in the storage prior to the powering up, wherein the random seed was previously used as an input to generate the random playlist, resulting in a particular sequence of the plurality of media items, the particular sequence randomly generated;
after the accessing, generating the particular sequence of the plurality of media items based on the stored random seed for regenerating the random playlist with the particular sequence of the plurality of media items; and
playing at least one of the plurality of media items according to the particular sequence of the random playlist.

12. The non-transitory computer readable medium of claim 11, further comprising:
accessing a stored counter from the storage of the portable media device, the stored counter having been stored in the storage prior to the powering up, wherein the playing comprises playing the at least one of the plurality of media items based on the accessed counter.

13. The non-transitory computer readable medium of claim 11, further comprising:
accessing a stored playlist identifier from the storage of the portable media device, the stored playlist identifier having been stored in the storage prior to the powering up, wherein the stored playlist identifier is associated with the plurality of media items, and wherein the generating comprises generating the particular sequence based on the stored playlist identifier.

14. A system for managing a playlist of a plurality of media items on a portable media device comprising:
a storage; and
a processing system, wherein the processing system is configured to:
generate a random seed, wherein the random seed once generated, is used as an input to generate a random playlist, resulting in a particular sequence of the plurality of media items, the particular sequence randomly generated;
using the generated random seed as the input, generate the particular sequence of the plurality of media items based on the random seed;
generate a shuffled playlist based on the particular sequence; and
save the random seed in the storage before powering down the portable media device, wherein the random seed is used to regenerate the shuffled playlist based on the particular sequence.

15. The system of claim 14, further comprising:
a memory, wherein the processing system is further configured to copy the random seed from the memory to the storage before powering down the portable media device.

16. The system of claim 14, wherein the processing system is further configured to save a playlist identifier in the storage before powering down the portable media device, and wherein the playlist identifier is associated with the playlist.

17. The system of claim 14, wherein the processing system is further configured to:
play at least one of the plurality of media items according to the particular sequence of the shuffled playlist before powering down the portable media device; and
save a counter in the storage before powering down the portable media device, wherein the counter is incremented for each of the at least one of the plurality of media items played according to the particular sequence of the shuffled playlist.

18. The system of claim 17, wherein the processing system is further configured to:
power on the portable media device after powering down the portable media device;
access the saved random seed from the storage;
regenerate the particular sequence of the plurality of media items based on the accessed saved random seed;
regenerating the shuffled playlist based on the regenerated particular sequence;
accessing the saved counter; and
playing at least a particular one of the plurality of media items according to the regenerated particular sequence of the regenerated shuffled playlist based on the accessed saved counter.

19. The system of claim 14, wherein the processing system is further configured to:
receive an instruction to power down the portable media device; and
save the random seed in the storage in response to receiving the instruction.

20. The system of claim 14, wherein the processing system is further configured to:
power on the portable media device after powering down the portable media device;
access the saved random seed from the storage; and
regenerate the particular sequence of the plurality of media items based on the accessed saved random seed.

21. A non-transitory computer readable medium including instructions for managing a playlist of a plurality of media items on a portable media device which, when executed by a processing system, cause the processing system to perform a method, the method comprising:
generating a random seed, wherein the random seed once generated, is used as an input to generate a random playlist, resulting in a particular sequence of the plurality of media items, the particular sequence randomly generated;
generating the particular sequence of the plurality of media items based on the random seed;
generating the random playlist based on the particular sequence;
playing at least one of the plurality of media items according to the particular sequence of the random playlist;
incrementing a counter for each of the at least one of the plurality of media items played according to the particular sequence of the random playlist; and
storing the random seed and the incremented counter for regenerating the random playlist.

22. A system for managing a playlist of a plurality of media items on a portable media device comprising:
a memory;
a storage; and
a processing system, wherein the processing system is configured to:
after the portable media device is powered up at a particular time, access a stored random seed from the storage, the stored random seed having been stored in the storage prior to the particular time, wherein the stored random seed was previously used as an input to generate a random playlist, resulting in a particular sequence of the plurality of media items, the particular sequence randomly generated, and wherein the stored random seed is used to regenerate the random playlist;

copy the accessed stored random seed from the storage to the memory; and generate the particular sequence of the plurality of media items based on the accessed stored random seed to regenerate the playlist.

23. The system of claim 22, wherein the processing system is further configured to:

play at least one of the plurality of media items according to the generated particular sequence.

24. The system of claim 22, wherein the processing system is further configured to:

copy a playlist identifier from the storage to the memory, wherein the playlist identifier is associated with the playlist; and generate the particular sequence of the plurality of media items based on the accessed stored random seed and the copied playlist identifier.

25. A method for managing a playlist of a plurality of media items on a portable media device comprising:

generating a random seed, wherein the random seed once generated, is used as an input to generate a random playlist, resulting in a particular sequence of the plurality of media items, the particular sequence randomly generated;

using the generated random seed as the input, generating the particular sequence of the plurality of media items for defining the random playlist;

receiving an instruction to power down the portable media device;

saving the random seed in a storage of the portable media device, wherein the generated random seed is used to regenerate the random playlist with the particular sequence of the plurality of media items; and powering down the portable media device.

26. The method of claim 25, further comprising:

presenting at least a portion of the plurality of media items according to the particular sequence prior to the powering down.

27. The method of claim 25, wherein the saving is performed in response to the receiving of the instruction.

28. The method of claim 25, further comprising:

powering on the portable media player after the powering down;

accessing the saved random seed from the storage; and regenerating the particular sequence of the plurality of media items based on the accessed saved random seed for redefining the random playlist.

29. The method of claim 25, further comprising:

playing at least one of the plurality of media items according to the particular sequence of the random playlist prior to the receiving of the instruction;

updating a counter for tracking the playing of the at least one of the plurality of media items; and saving the counter before the powering down.

30. The method of claim 29, further comprising:

powering on the portable media player after the powering down;

accessing the saved random seed from the storage;

regenerating the particular sequence of the plurality of media items based on the accessed saved random seed for redefining the random playlist;

accessing the saved counter; and playing at least a particular one of the plurality of media items according to the regenerated particular sequence based on the accessed saved counter.

31. A non-transitory computer readable medium including instructions for managing playlists on a portable media device which, when executed by a processing system, cause the processing system to perform a method, the method comprising:

generating a first particular sequence of a first plurality of media items of a first playlist based on a first random seed wherein the first random seed once generated, is used as an input to generate a random playlist, resulting in the particular sequence of the first plurality of media items, the first particular sequence randomly generated;

playing at least one media item of the first plurality of media items of the first playlist according to the generated first particular sequence;

receiving an instruction to play a second playlist of a second plurality of media items;

copying to a memory the first random seed and a first counter value associated with one of the at least one media item of the first plurality of media items of the first playlist played according to the generated first particular sequence, wherein the first random seed is used to regenerate the first particular sequence of the first playlist; and playing the second playlist.

32. The non-transitory computer readable medium of claim 31, further comprising:

receiving an instruction to play the first plurality of media items of the first playlist according to the first particular sequence;

accessing from the memory the copied first random seed and the copied first counter value;

regenerating the first particular sequence of the first plurality of media items of the first playlist based on the accessed first random seed; and playing the first plurality of media items of the first playlist according to the regenerated first particular sequence and based on the accessed first counter value.

33. A non-transitory computer readable medium including instructions for managing a playlist of a plurality of media items on a portable media device which, when executed by a processing system, cause the processing system to perform a method, the method comprising:

powering up the portable media device;

after the powering up, copying a random seed and a counter value from storage of the portable media device to memory of the portable media device, wherein the random seed and the counter value are used to regenerate the playlist, and wherein the random seed and the counter value were stored in the storage prior to the powering up, wherein the random seed was previously used as an input to generate a random playlist, resulting in a particular sequence of the plurality of media items, the particular sequence randomly generated;

initializing a value of a playlist index;

generating a number of elements of the particular sequence of the plurality of media items based on the copied random seed, wherein the number is equal to the value of the playlist index;

after the generating, if the value of the playlist index is less than the copied counter value, increasing the value of the playlist index by one and then repeating the generating; and after the generating, if the value of the playlist index is equal to the copied counter value, playing the media item of the plurality of media items associated with the most recently generated element of the particular sequence, increasing the value of the playlist index by one, increasing the value of the copied counter value by one, and then repeating the generating.

34. The non-transitory computer readable medium of claim 33, wherein the instructions, when executed by the processing system, further cause the method to comprise:

after the generating, if the value of the playlist index is less than the copied counter value, marking the media item of the plurality of media items associated with the most recently generated element of the particular sequence as played, increasing the value of the playlist index by one, and then repeating the generating.

\* \* \* \* \*